Patented Oct. 2, 1951

2,569,541

UNITED STATES PATENT OFFICE 2,569,541

ELECTRICAL INSULATION COMPRISING POLYETHYLENE, POLYISOBUTYLENE, ISOBUTYLENE-DIOLEFIN COPOLYMER, AND LUBRICANT

Harold E. Selby, Brooklyn, N. Y., assignor, by mesne assignments, to Bishop Manufacturing Corporation, Summit, N. J., a corporation of New Jersey No Drawing. Application October 19, 1949, Serial No. 122,355

5 Claims. (Cl. 260—23.7)

This invention relates to insulating materials of high dielectric strength for insulating electrical conductors and the like. It relates particularly to improved insulating compositions which may be readily extruded to form sheaths for electrical conductors and the like.

The insulating material used for many years, as sheaths for electrical conductors, has been of the rubber-base type. Such rubber-base materials have certain undesirable characteristics which have rendered them something less than satisfactory for many purposes. For example, while rubber-base insulation has high dielectric strength, it deteriorates quickly in the presence of ozone. For this reason, great difficulty has been encountered in properly insulating electrical conductors which are used for or near high voltage lines or other equipment where corona discharge or other ozone generating conditions are present. Also, the rubber base materials have low impact resistance at low temperatures. Deterioration also occurs at high temperatures with consequent loss of resiliency and adhesion and separation of the rubber from the conductor.

For the above reasons, others have suggested that more stable compounds might be used for the insulation of electrical conductors. For example, it has been suggested that insulating materials of satisfactory dielectric properties may consist of a mixture of a high molecular weight polyethylene, butyl rubber (a rubbery copolymer of isobutylene and a diolefin in approximately the proportions of 98:2), an isobutylene polymer and certain curvatives which permit the mixture to be vulcanized or cured. These compositions have been fairly satisfactory but they are difficult to process, they require curing and the cost of the material is substantially higher than the rubber-base materials used heretofore.

Also, it has been suggested that isobutylene polymers can be used in conjunction with butyl rubber without curatives for a number of purposes other than insulation. Usually, this combination of components is used in conjunction with another filler material which permits the composition to be processed and handled in a more satisfactory manner.

I have discovered that the disadvantages of the prior insulating compositions can be overcome by a suitable mixture of relatively oxidation resistant materials which impart thermoplastic properties to the composition rendering it highly suitable for extrusion in a conventional wire covering apparatus to produce an insulating sheath that is smooth, uniform, free of pinholes, has good adhesion to the conductor and has high resistance to impact below —40° F. and is stable at temperatures as high as 175° F. and even higher. The composition need not be vulcanized or cured so that upon application to the conductor, all that is required is cooling of the material to place the conductor in condition for immediate use.

The composition embodying the present invention consists of a mixture, in suitable proportions, of polyethylene, polymerized isobutylene of an intermediate molecular weight or a mixture of isobutylene polymers, some of which are of high molecular weight and others of relatively low molecular weight, butyl rubber and a lubricant to facilitate extrusion of the composition. The new insulating composition is free of curatives but it may include a small proportion of an antioxidant to eliminate any tendency of the composition to deteriorate in the presence of ozone. Actually, the composition contains very little unsaturated material so that there are only a few linkages available for coupling with oxygen and thus, the material does not deteriorate in the presence of ozone.

The functions of the various components of the new insulating composition are believed to be as follows:

Polyethylene is a good insulator but it has the undesirable property of being semi-rigid and having little impact resistance and physical strength at ordinary or low temperatures.

Butyl rubber is highly compatible with polyethylene and it has the function of reducing the rigidity of the polyethylene and imparting increased resiliency and strength to mixtures of polyethylene and butyl rubber.

Polymerized isobutylene increases the tear strength of the material and also appears to increase the resistance of the composition to oxidation, especially oxidation by ozone. It, also, when of the proper molecular weight and in the proper proportion, reduces the rubberiness imparted by the butyl rubber.

The lubricant serves its expected function of rendering the material more easily extruded and it may be any of a number of compositions. Higher fatty acids such as stearic acid are entirely suitable for this purpose and other lubricants of similar nature which are commonly used in the rubber and plastic industry for this purpose may be used with equal facility.

The proportions of the various components of the new composition can be varied within relatively wide limits without diminishing the insulating properties of the composition or of making it excessively difficult to process and extrude. The various components may be varied within the following range of proportions:

|  | Parts |
|---|---|
| Polyethylene, about 20,000 m. w | 24 to 48 |
| Butyl rubber | 7 to 14 |
| Polymerized isobutylene, 100,000 to 115,000 m. w | 10 to 21 |
| Polymerized isobutylene, 10,000 to 20,000 m. w | 4 to 9 |
| Lubricant | ½ to 2 |

A single isobutylene polymer having a molecular weight between about 40,000 and 60,000 may be used instead of the mixed high and low molecular weight polymers. As indicated, the proportion of the polyethylene may be varied quite substantially inasmuch as it is in the nature of an inert filler having high dielectric value. If, however, the proportion of the polyethylene is decreased much below the minimum proportion specified, the composition tends to become rubbery and thus to shrink after extrusion with the result that it may pull away from the conductor to which it is applied. If the proportion of polyethylene substantially exceeds the maximum proportion, the composition loses its impact resistance and resiliency, especially at low temperatures.

The polyisobutylenes are commercially available products identified by the indicated molecular weights. The molecular weights of the polyisobutylenes were determined by the Staudinger method for determination of intrinsic viscosity average molecular weight as described in the Standard Laboratory Inspection Circular 320.01 of February 28, 1944.

The polymerized isobutylene and butyl rubber cooperate with the polyethylene to reduce the effect of thermal shock on the composition. Polyethylene alone, if heated, and then chilled abruptly, would shatter. The butyl rubber component improves the rubberiness or plasticity of the material and adds the physical strength which is lacking in the polyethylene. However, if the proportion of butyl rubber is increased much above the maximum proportion indicated, the resulting material loses strength making it difficult to process and handle.

Generally the same may be said of the isobutylene polymer. That is, when the proportion of the isobutylene polymer or mixture of polymers is decreased much below the proportions specified, the material becomes short and breaks easily. On the other hand, if the proportion of the low molecular weight polymerized isobutylene is increased much above the maximum limit, the material becomes very tacky and sticky and cannot be milled or extruded.

When too high a proportion of the high m. w. polymerized isobutylene is present, the material becomes tough and has a hard horny consistency which is undesirable in an insulating material subjected to bending. Therefore, while the composition can be varied somewhat above and below the limits specified, the best results are obtained when the several components are present in about the proportions specified.

A preferred example of the composition consists of:

| Polyethylene, about 20,000 m. w | 12 lbs. |  |
|---|---|---|
| Polymerized isobutylene, 100,000 to 115,000 m. w | 5 lbs. | 15 oz. |
| Polymerized isobutylene, 10,000 to 20,000 m. w | 21 lbs. | 6½ oz. |
| Butyl rubber | 3 lbs. | 5 oz. |
| Stearic acid |  | ½ oz. |

This composition can be easily extruded in a conventional wire covering machine at 320° F. to produce an insulating sheath that is smooth, uniform, free of pinholes, adheres strongly to the conductor and is resistant to impact and flow within a range of temperatures between about −40° F. and 175° F. or even higher. Upon cooling after extruding, no further treatment of the material is required to render it stable so that the insulated wire may be wound on reels or the like in the usual way without any further treatment.

The insulating material can be made in different colors and the proportions of its components may be varied, as indicated above, to meet the conditions of service to which it is subjected. Therefore, it will be understood that the example given above is merely illustrative of the preferred embodiment of the invention and should not be construed as limiting the scope of the following claims.

I claim:

1. An insulating composition consisting essentially of between about 24 and 28 parts of polyethylene having a molecular weight of about 20,000, between about 14 and 30 parts of at least one isobutylene homopolymer having an average molecular weight between about 40,000 and 60,000, between about 7 and 14 parts of a rubbery copolymer of isobutylene and a diolefin in approximately the proportions of 98:2, and between about ½ part and 2 parts of a lubricant, all parts being by weight, said composition being thermoplastic and extrudable at elevated temperature and resistant to shattering under impact at temperatures below 0° F.

2. An insulating composition consisting essentially of about 24 to 48 parts of polyethylene having a molecular weight of about 20,000, about 7 to 14 parts of a rubbery copolymer of isobutylene and a diolefin in approximately the proportions of 98:2, about 10 to 21 parts of polymerized isobutylene having a molecular weight of about 100,000 to 115,000, about 4 to 9 parts of polymerized isobutylene having a molecular weight of about 10,000 to 20,000 and about ½ to 2 parts of a lubricant, all parts being by weight, said composition being thermoplastic and extrudable at temperatures in the vicinity of 320° F. and resistant to shattering under impact at temperatures below 0° F.

3. The insulating composition set forth in claim 2 in which the lubricant is a higher fatty acid.

4. The insulating composition set forth in claim 2 in which the lubricant is stearic acid.

5. An insulating composition consisting essentially, in about the following ratio by weight, of about 12 pounds of polyethylene having a molecular weight of about 20,000, about 5 lbs. 15 oz. of polymerized isobutylene having a molecular weight of 100,000 to 115,000, about 21 lbs. 6½ oz.

of polymerized isobutylene having a molecular weight of 10,000 to 20,000, about 3 lbs. 5 oz. of a rubbery copolymer of isobutylene and a diolefin in approximately the proportions of 98:2, and about ½ to 2 oz. of stearic acid, said composition being thermoplastic, and extrudable at a temperature of about 320° F., and resistant to shattering at temperatures as low as —40° F.

HAROLD E. SELBY.

REFERENCES CITED

The following references are of record in the file of this patent:

UNITED STATES PATENTS

| Number | Name | Date |
|---|---|---|
| 2,339,958 | Sparks | Jan. 25, 1944 |
| 2,369,471 | Latham | Feb. 13, 1945 |
| 2,451,865 | O'Brien | Oct. 19, 1948 |

OTHER REFERENCES

Flory, J. Am. Chem. Soc., March 1943, pages 372–382.

Hahn et al., Ind. and Eng. Chem., June 1945, pages 526, 531, 532, 533.